Nov. 11, 1952     E. C. CONDIT     2,617,416
DEVICE FOR COLONIC IRRIGATION OR BOWEL FLUSHING
Filed June 1, 1948
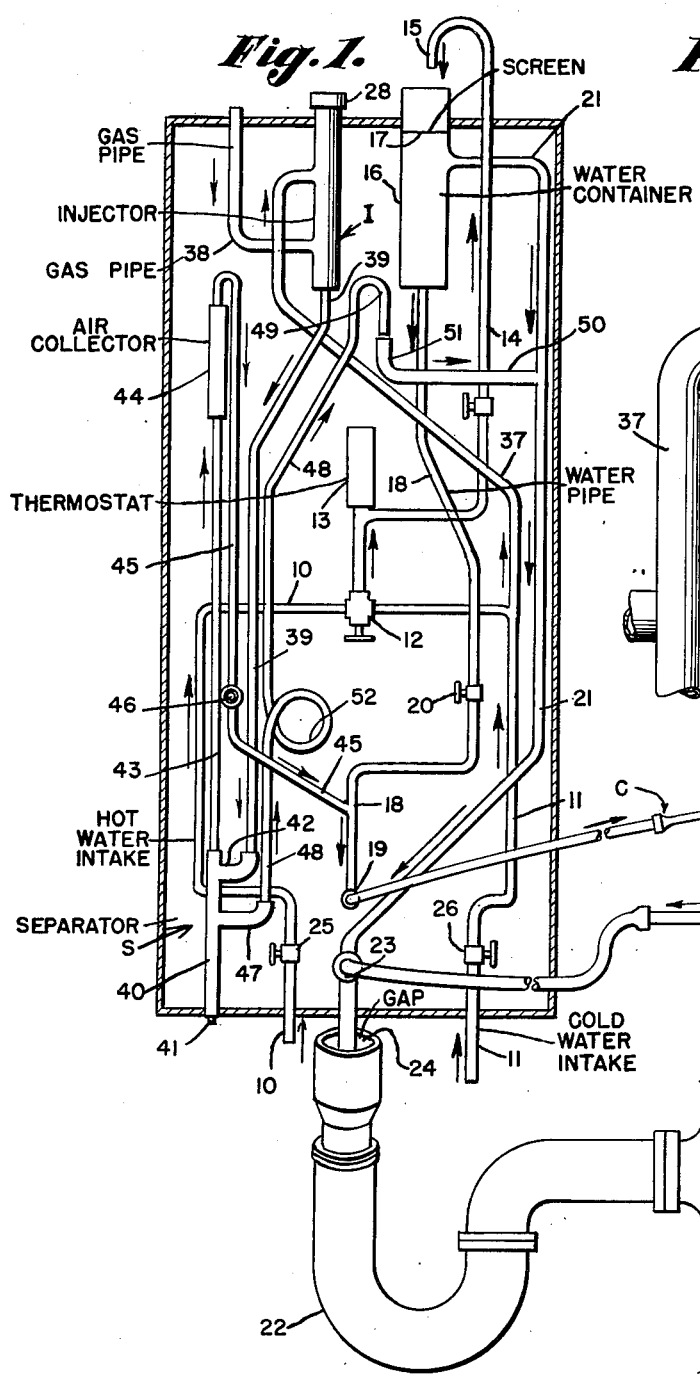
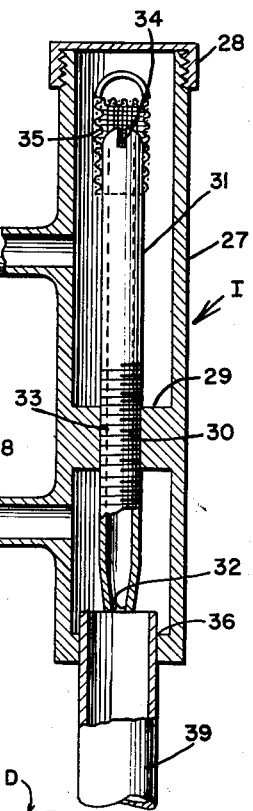
INVENTOR.
Elvin C. Condit
BY
Wilfred Lawson
Attorney Patented Nov. 11, 1952

2,617,416

UNITED STATES PATENT OFFICE 2,617,416

DEVICE FOR COLONIC IRRIGATION OR BOWEL FLUSHING

Elvin C. Condit, Glendale, Calif.

Application June 1, 1948, Serial No. 30,283

4 Claims. (Cl. 128—227)

The invention relates to improvements of devices for colonic irrigation or bowel flushing, and the primary object of the invention is to provide a colonic irrigation device equipped with means for aerating the irrigation water with a desired suitable gas such as ozone, oxygen, air or the like.

Another object of the invention is to mix the gas mechanically with the water by means of an injector.

A further object of the invention is to provide a colonic irrigation device of the character indicated above, in which the mechanical mixture of gas and water is urged through an air separator, where the larger portion of the gas leaves the mixture and rises to a gas collector, from where it is fed to the water pipe leading to the patient, while the biggest portion of the water rises to a discharge water pipe leading to a water trap.

Other objects of the invention may appear in the following specification describing it with reference to the accompanying drawing, illustrating a preferred embodiment of the invention. It is however, to be understood that the invention is not to be limited or restricted to the exact construction and combination of parts described in the specification and shown in the drawing, but that such changes and modifications can be made, which fall within the scope of the claims appended hereto.

In the several figures of the drawing, similar parts are indicated by similar reference characters, and Figure 1 is a diagrammatic view illustrating a colonic irrigator or flushing device embodying the invention; and Figure 2 is an enlarged fragmentary view partly in section and partly in elevation of the injector herein comprised.

The colonic irrigation device embodied herein comprises an intake pipe 10 connected with a source of hot water (not shown) and a second intake pipe 11, connected with a source of cold water (not shown). The two intake pipes lead to a mixing valve 12 controlled by a thermostat 13 to mix the hot and cold water to a predetermined temperature. From the thermo-mixing valve a pipe 14 conducts the tempered water to the downwardly extending end portion 15 of said pipe. At a distance of approximately one inch below the outlet end 15 a water container 16 is located. The water is forced under pressure through the pipes described above, but the gap between the outlet end 15 and the water container 16 eliminates the pressure and from the water container, the irrigation water is fed by gravity only. To eliminate any impurities from the irrigation water a screen 17 is arranged below the entrance of the water container. From the bottom of the container a pipe 18 leads to the supply connection 19 for a syringe nozzle or colon tube C. A valve 20 inserted in the pipe 18 provides a means of controlling the fluid passing to the patient. An overflow pipe 21 communicates with the interior of the water container 16 just below the screen 17 and leads downwardly to a conventional water trap 22. The reference numeral 23 designates a connection with the pipe 21 for the outlet of a diagnostic tube D, of transparent material, through which passes the irrigation water and waste material from the patient, into the waste pipe 22 and a gap 24 is provided in the connection between the overflow pipe 21 and the water trap 22 to prevent any back pressure. Regulator valves 25 and 26 are inserted in the hot and cold water inlet pipes 10 and 11 respectively.

At approximately the same level with the water container 16 an injector I is arranged comprising a substantially cylindrical hollow body 27, the upper end of which is closed by a removable screw cap 28. Intermediate the ends of the body 27 a partition 29 extends diametrically through the body and is provided with a tapped central hole 30. A hollow cylindrical injector stem 31 is provided with conically reduced lower end portion providing a comparatively small outlet hole 32 at its lowermost end. Intermediate its ends the injector stem is provided with a male thread 33 adapted to engage the tapped hole 30 in the partition 29. In the upper end portion of the injector stem a diametrical screw driver kerf 34 is provided to facilitate the mounting of the injector stem 31 in the body 27. A screen cap 35 is removably mounted on the top end portion of the injector stem to prevent impurities from entering into said stem. When the stem 31 is mounted in the body 27 the outlet end 32 of said stem is located inside the body below the partition 29 adjacent the bottom 36 of the body. A cold water pipe 37 is connected with the cold water inlet pipe 11 and communicates with the interior of the injector body 27 above the partition 29. When the regulator valve 26 is opened, cold water flows under city pressure or the like through the cold water pipe 37 into the upper portion of the injector body 27, filling it and entering the injector stem 31, through the screen cap 35. A gas pipe 38 leads from a source of gas such as air, ozone or the like (not shown) to the space in the injector body 27 below the partition 29 and a pipe 39 enters said space through the bottom 36 so that the cold water forced under pressure through the injector stem 31 will be forcibly injected in and through the pipe 39 creating a suction in the lower portion of the injector body 27, by means of which gas is sucked through the gas pipe 37, and into the pipe 39 and is mixed mechanically with the cold water. The aerated water is conducted by the pipe 39 to a separator S comprising a main tubular body 40 closed at its lower end by a removable drain plug 41 and having adjacent its upper end a laterally extending upwardly curved tubular branch 42, in which the pipe 39 ends. The aerated water in the pipe 39 flows through the branch 42 into the tubular body 40. Most of the gas contained in the aerated water rises upwardly and enters an air pipe 43 leading into an air collector 44 from the upper end of which the gas flows through an air pipe 45 into the pipe 18 conducting the irrigation water to the colon tube or nozzle connection 19, so that the gas enters the irrigation water. The flow of the gas from the collector to the irrigation water pipe 18 is regulated and controlled by a control valve 46 in the pipe 45.

A lower tubular branch 47 is provided on the separator body 40 at a level below the upper tubular branch 42. The water conducted through the pipe 39 into the separator is forced through the lower branch 47 into an upwardly extending pipe 48, the upper end portion 49 of which is bent to extend downwardly. A pipe 50 extends laterally from the overflow pipe 21 and the free end of the pipe 50 is bent upwardly as at 51 so that the end of the pipe is located under the outlet end 49 of the pipe 48 and the water rising from the separator through the pipe 48 passes from the pipe end 49 into the pipe end 51 of the pipe 50 through a gap between the adjacent ends of the pipes. The gap between the pipe ends 49 and 51 is provided to prevent syphoning of water from the separator pipe 48.

A loop 52 is provided in the pipe 48 above the lower tubular branch 47 to cause additional back pressure in the separator body 40 to thereby insure separation of the gas from the water in the separator.

In the operation of the apparatus herein disclosed the irrigation water which has been brought to the proper temperature in the mixing valve 12 is discharged into the container 16 from which it flows by gravity, and under proper control by means of the valve 20, to the patient receiving the enema, by way of the nozzle or colon tube C.

As the enema or irrigation water passes through the pipe 18 to the colon tube it has fed to it, by way of the pipe 45, and under the control of the valve 46, the desired gas which may be air, ozone or ordinary oxygen, which has been forced down through the pipe 39 by water discharged under pressure through the injector nozzle 32. As previously stated, the gas is forced through the pipe 39 by being mixed with the water passing from the injector nozzle 32 during which process the gas is washed before being collected in the tank 44 to pass on into the pipe 18 and to the nozzle or tube C.

The irrigation or enema water ejected from the patient passes through the transparent tube D to the connection 23 from which it passes into the sewer trap 22. As the discharging water passes through the transparent tube, the physician or other person giving the treatment can observe the character of the discharge and make a diagnosis accordingly.

I claim:
1. A colonic irrigation device comprising a mixing valve, a hot water pipe connected to the mixing valve, a cold water pipe connected to the mixing valve, an upwardly extending outlet pipe connected to the mixing valve and having a downwardly directed outlet end portion, a water container arranged to receive water from said outlet end portion, an irrigation pipe connected with and leading from the lower end of the container and through which the water flows by gravity from the container, means for connecting an enema tube to said irrigation pipe, an overflow pipe connected at one end with and leading from the container adjacent its lower end, the overflow pipe being connected at its other end to a drain pipe, means for connecting with the overflow pipe an enema waste water conducting means, an injector body, an injector supply pipe connected with said water pipe and opening into the upper portion of the injector body, an injector stem within the injector body and communicating with one end of said supply pipe, a gas pipe communicating with the lower portion of the injector body for conducting gas from a source of supply into the lower portion of the injector body, a gas and water pipe leading from the bottom of the injector body and receiving water from the other end of the injector stem, a gas separator, said gas and water pipe being connected to said separator where the gas and water are separated, a pipe connected between the separator and the irrigation pipe for conducting gas to the latter, and a pipe connected between the separator and the drain pipe.

2. A colonic irrigation device as set forth in claim 1 wherein the gas separator comprises a hollow body, an upper intake branch on said body and connected with the gas and water pipe and receiving the gas and water therefrom, a lower discharge branch on said separator body, and connected with the last named pipe, said last named pipe being constructed to conduct the water from the gas separator body over a gap into the overflow pipe.

3. A colonic irrigation device as set forth in claim 1, wherein the gas separator comprises a hollow body, an upper intake branch on said body and connected with the gas and water pipe and receiving the gas and water therefrom, a lower discharge branch on said separator body, and connected with the last named pipe, said last named pipe being constructed to conduct the water from the gas separator body over a gap into the overflow pipe, and a loop formed in the said last named pipe above the discharge branch.

4. A colonic irrigation device as set forth in claim 1, wherein the said pipe for conducting gas to the irrigation pipe extends upwardly from the gas separator and includes a gas collector in the upper part of the gas pipe from which the gas pipe continues to the irrigation pipe.

ELVIN C. CONDIT.

REFERENCES CITED

The following references are of record in the file of this patent:

UNITED STATES PATENTS

| Number | Name | Date |
| --- | --- | --- |
| Re. 21,615 | Irwin | Nov. 5, 1940 |
| 1,127,898 | King | Feb. 9, 1915 |
| 1,887,359 | Marubio | Nov. 8, 1932 |
| 2,272,381 | Marvin | Feb. 10, 1942 |
| 2,313,805 | Crawford et al. | Mar. 16, 1943 |